United States Patent
Ionescu

(10) Patent No.: US 7,291,986 B2
(45) Date of Patent: Nov. 6, 2007

(54) STEP SINUSOIDAL VOLTAGE CONTROLLING METHOD FOR HID, FLOURESCENT AND INCANDESCENT LIGHT DIMMING APPLICATIONS

(75) Inventor: Adrian F. Ionescu, Cluj-Napoca (RO)

(73) Assignee: Power Control Technologies, Inc., Wilmington, DE (US)

( * ) Notice: Subject to any disclaimer, the term of this patent is extended or adjusted under 35 U.S.C. 154(b) by 0 days.

(21) Appl. No.: 10/596,551

(22) PCT Filed: Aug. 11, 2006

(86) PCT No.: PCT/US2004/041837

§ 371 (c)(1),
(2), (4) Date: Aug. 11, 2006

(87) PCT Pub. No.: WO2005/059570

PCT Pub. Date: Jun. 30, 2005

(65) Prior Publication Data
US 2007/0090770 A1    Apr. 26, 2007

Related U.S. Application Data

(60) Provisional application No. 60/481,804, filed on Dec. 17, 2003.

(51) Int. Cl.
H05B 41/16 (2006.01)
H05B 37/02 (2006.01)
H02B 1/24 (2006.01)

(52) U.S. Cl. ............ 315/276; 315/299; 315/308; 315/362; 307/115; 307/130; 307/131

(58) Field of Classification Search ........ 315/246, 315/276, 282, 283, 287, 291, 299, 307, 308, 315/362; 307/106, 113, 115, 125, 130, 131, 307/157; 323/355
See application file for complete search history.

(56) References Cited

U.S. PATENT DOCUMENTS

| | | | | |
|---|---|---|---|---|
| 3,281,654 A | * | 10/1966 | Reinert | 323/263 |
| 4,622,513 A | * | 11/1986 | Stich | 323/343 |
| 4,673,888 A | * | 6/1987 | Engelmann et al. | 330/10 |
| 4,716,357 A | * | 12/1987 | Cooper | 323/263 |
| 4,873,617 A | * | 10/1989 | Fredrick et al. | 363/17 |
| 4,873,618 A | * | 10/1989 | Fredrick et al. | 363/17 |
| 5,500,575 A | * | 3/1996 | Ionescu | 315/307 |
| 5,714,847 A | * | 2/1998 | Lindauer et al. | 315/307 |

* cited by examiner

*Primary Examiner*—Thuy Vinh Tran
(74) *Attorney, Agent, or Firm*—Connolly Bove Lodge and Hutz

(57) ABSTRACT

A step voltage controlling device and method for High Intensity Discharge (HID) light dimming applications includes an autotransformer, voltage sensing block, current sensing block, pulse forming block, microprocessor control unit (MCU) block and plural three switch blocks which allows an instantaneous variation of the voltage applied to the load which is controlled to be synchronized with the load current zero crossing point.

2 Claims, 5 Drawing Sheets

STEP SINUSOIDAL VOLTAGE CONTROLLING METHOD FOR HID, FLOURESCENT AND INCANDESCENT LIGHT DIMMING APPLICATIONS

FIELD OF THE INVENTION

This disclosure relates to alternating current voltage controllers, more particularly to controllers for varying the AC voltage applied to a large variety of lighting loads, including, but not limited to all types of gas discharge lamps as well as incandescent lamps. This application claims priority under the Paris Convention to U.S. Provisional Application for Pat. Ser. No. 60/481,804 filed on Dec. 17, 2004, the entire contents of which are incorporated herein by reference.

BACKGROUND

A number of electronic high frequency switching AC voltage controllers have been devised for delivering a variable sinusoidal output voltage. U.S. Pat. No. 5,018,058 discloses how to obtain a pure sinusoidal output voltage waveform from the AC line voltage using switchmode electronic circuitry. Furthermore, U.S. Pat. Nos. 5,500,575 and 5,714,847 show other methods of obtaining a variable AC output voltage having a sinusoidal waveform. Although existing electronic high frequency switchmode AC voltage controller have several major advantages, such as a small size and weight and a relatively low manufacturing cost, their main disadvantage is the lack of capacity to correct the output voltage waveform when a heavy inductive and non-linear load, such as an electromagnetic ballast and a HID lamp are present. The result is a relatively large distortion of the output voltage that decreases the overall system efficiency.

BRIEF SUMMARY

The above described current/voltage distortions are at least reduced, if not eliminated by various embodiments of the invention by continuously magnetically coupling a version of the AC line voltage to the output voltage.

Although adjusting the output voltage in steps may be generally known for some applications, there are a number of loads, such as a High Pressure Sodium (HPS) Ballast, that do not accept this type of voltage control. Indeed, a HPS lamp will simply extinguish if the applied voltage sharply decreases. Embodiments of the invention described herein eliminates this inconvenience by providing a novel voltage step control algorithm, among other features.

In various embodiments of the invention, a step sinusoidal voltage controlling device and method for HID, fluorescent and incandescent light dimming applications includes use of a multiple tap step down autotransformer, multiple switch block, voltage sensing block, current sensing block, pulse forming block, and microprocessor control unit (MCU) block. In this context, step voltage-controlling means controlling an instantaneous variation of the voltage applied to the load that is synchronized with the load current zero crossing point.

DETAILED DESCRIPTION

Figure 1:
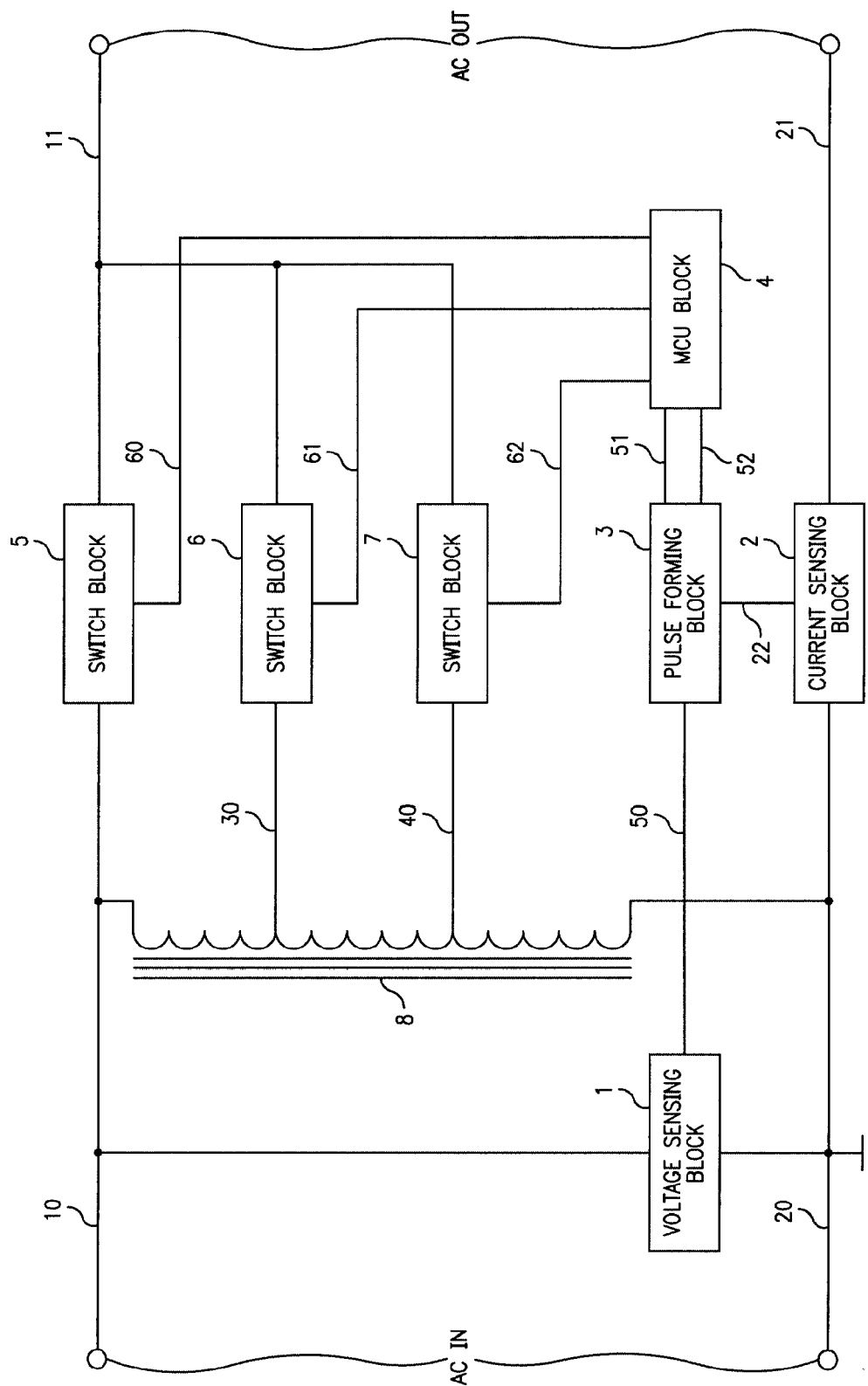
FIG. 1 represents the basic block diagram of the step sinusoidal voltage controlling device for HID, fluorescent and incandescent light dimming applications, for example.

An embodiment of the invention is illustrated in FIG. 1, and this device includes a multiple tap step-down autotransformer 8, voltage sensing block 1, current sensing block 2, pulse forming block 3, MCU block 4 and switch blocks 5, 6 and 7. As this embodiment is energized, MCU block 4 generates a command signal on line 60 for turning on switch block 5. This means that the step voltage controlling device always starts at full output voltage measured between lines 11 and 21, a voltage that is equal to the voltage measured between lines 10 and 20. It is generally known that a HID ballast must be first energized at its nominal voltage, and it must continue to operate at the nominal voltage until it reaches its normal operating parameters. This period of time when the HID ballast must first operate at nominal voltage is known as "lamp warm-up time".

Figure 5:
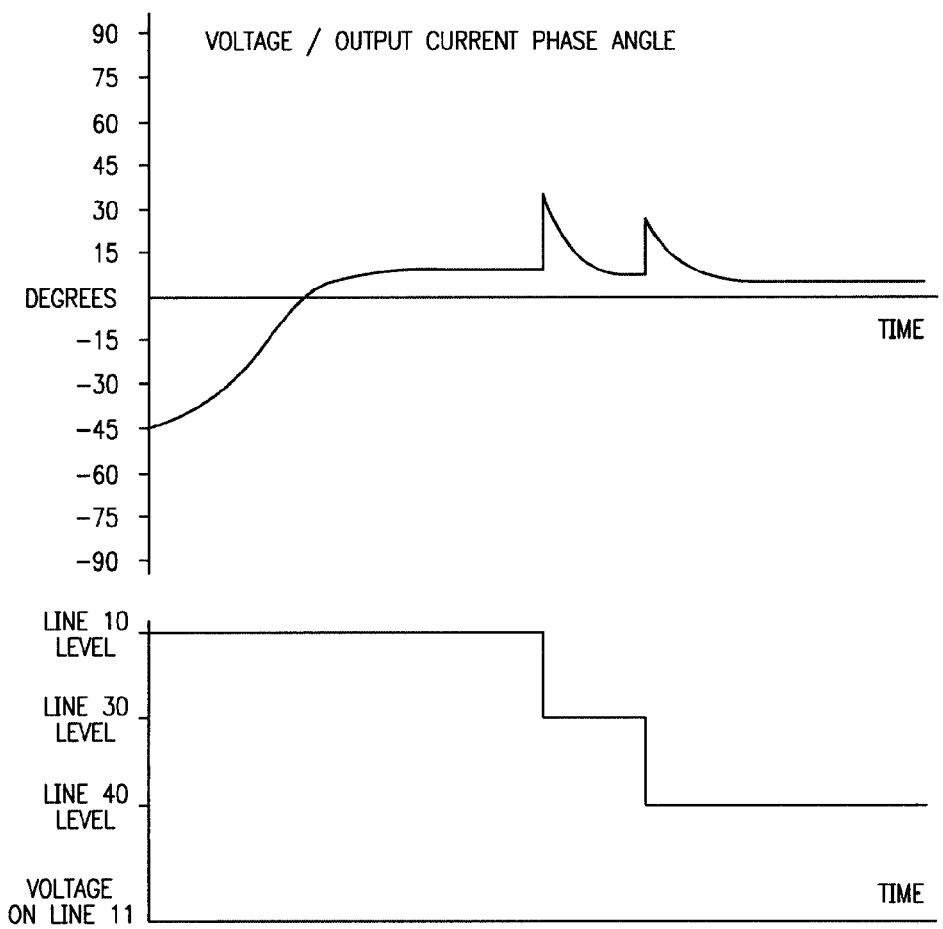
FIG. 5 describes the how the MCU block 4 automatically determines the ideal moment for a step voltage change based on the voltage/current trend evaluation.

FIG. 5 indicates the voltage/current phase angle for a HID ballast. When the ballast is first energized, the voltage current phase angle has a relatively high negative value. As the lamp warms-up, the phase angle decreases. When the phase angle stabilizes, it means that the ballast has reached its normal operating parameters, and therefore the ballast is capable to support an instantaneous variation of the applied voltage on line 11, from the level on line 10 to the level on line 30. MCU block 4 will remove the command signal on line 60, therefore turning off the switch block 5. The sequence to turn off switch block 5 is associated with a command signal generated on line 61 by MCU block 4 for turning on switch block 6. After this instantaneous applied voltage variation, the voltage/current phase angle sharply deteriorates; it drops at a low and stable value as the lamp is re-adjusting its temperature, as determined by the lower level of voltage on line 30. After the phase angle becomes stable, the ballast is, again, capable to support a new instantaneous variation of the applied voltage, from the level on line 30 to the level on line 40.

MCU block 4 will remove the command signal on line 61, therefore turning off the switch block 6. Turning off the switch block 6 sequence is associated with a command signal generated on line 62 by the MCU block 4 for turning on switch block 7.

Figure 2:
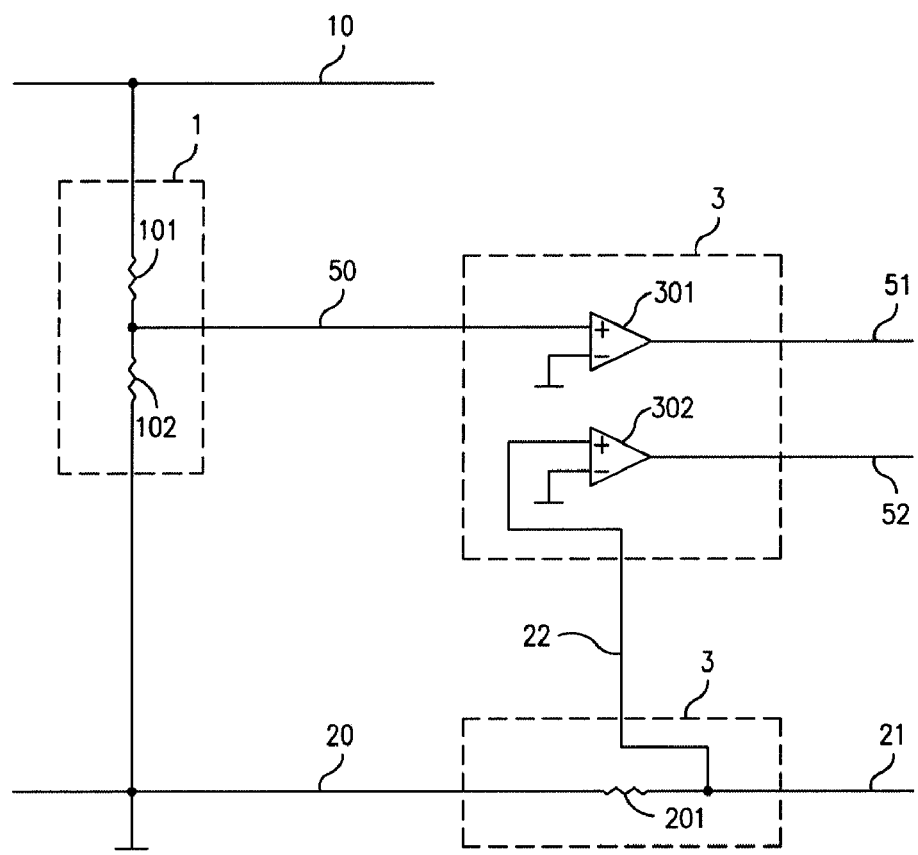
FIG. 2 represents the internal structure of the voltage sensing block 1, current sensing block 2 and pulse forming block 3.

FIG. 2 describes the voltage sensing block 1, current sensing block 2 and pulse forming block 3. Resistors 101 and 102 perform the voltage divider function for delivering to pulse forming block 3 of a low amplitude signal via line 50. The current sensing block 2 includes current sensing resistor 201 but, alternatively, a current transformer may be-also used, without departing from the spirit of the inventive concept.

A signal equivalent to the ballast current on lines 10, 11, 21 and 20 is applied to the pulse forming block 3 by the current sensing block 2 via line 22. Pulse forming block 3 contains the two comparators 301 and 302 for converting the positive half cycles of signals on lines 20 and 22 in square wave pulses to be delivered to the MCU block 4 via lines 51 and 52.

Figure 3:
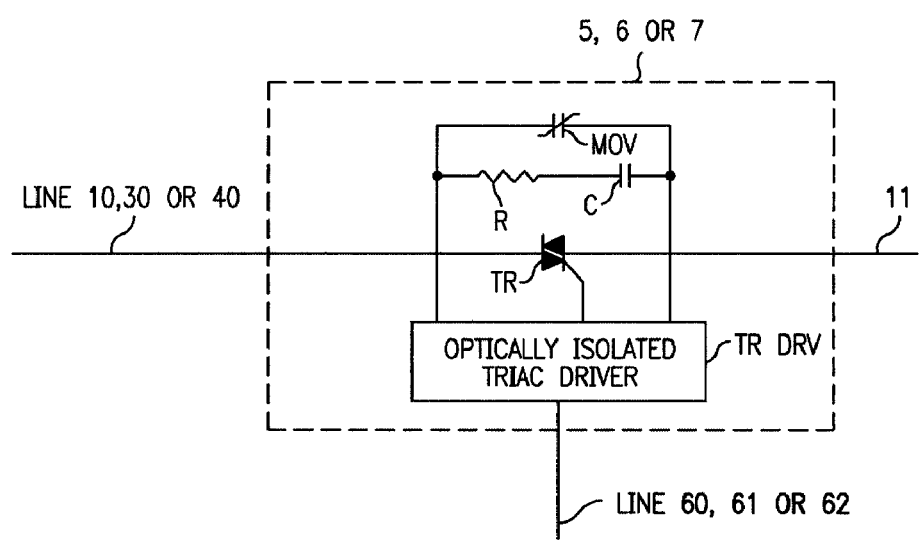
FIG. 3 describes the internal structure of the three identical switch blocks 5, 6 and 7, respectively.

FIG. 3 describes each of the switch blocks 5, 6 or 7. It consists of a power triac Tr, a triac conventional snubber network consisting of resistor R and capacitor C, and a metal oxide varistor MOV for absorbing any possible damaging high voltage transients. For safe interface with the MCU block 4 via line 60, 61 or 62, the triac Tr gate is energized by an optically isolated triac driver Tr Drv. There are many available triac gate driver opto-couplers available on the market; their use is known in the art, and is not described herein.

Figure 4:
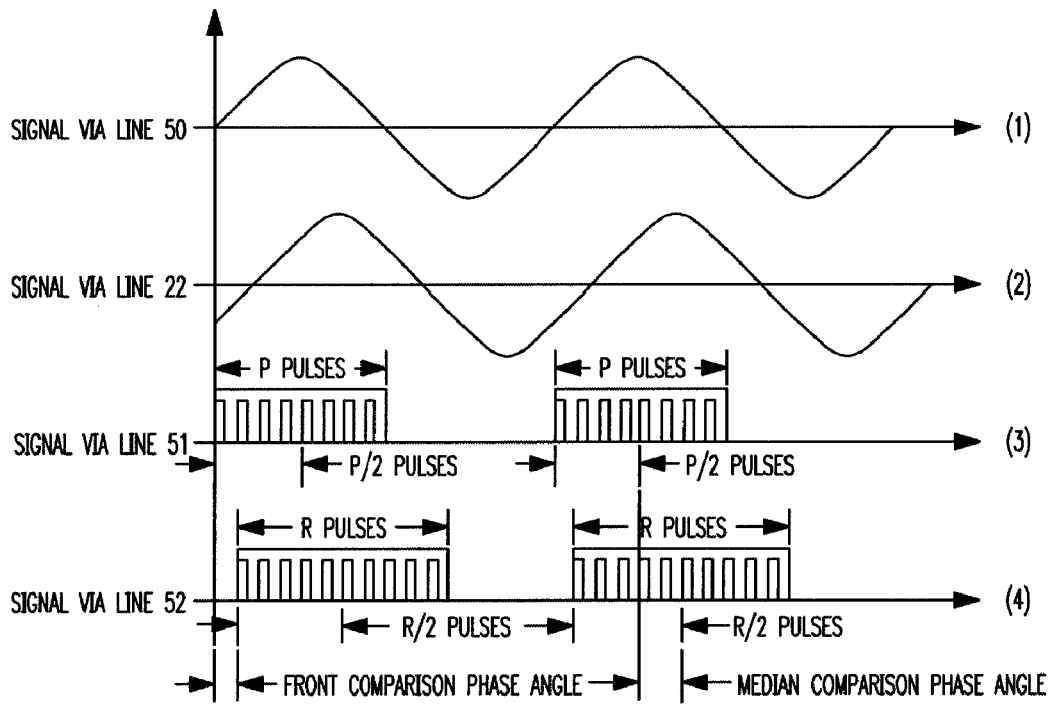
FIG. 4 describes the automatic elimination of the effect caused by the temperature coefficient of comparators 301 and/or 302 contained by the pulse forming block 3.
Figure 4:
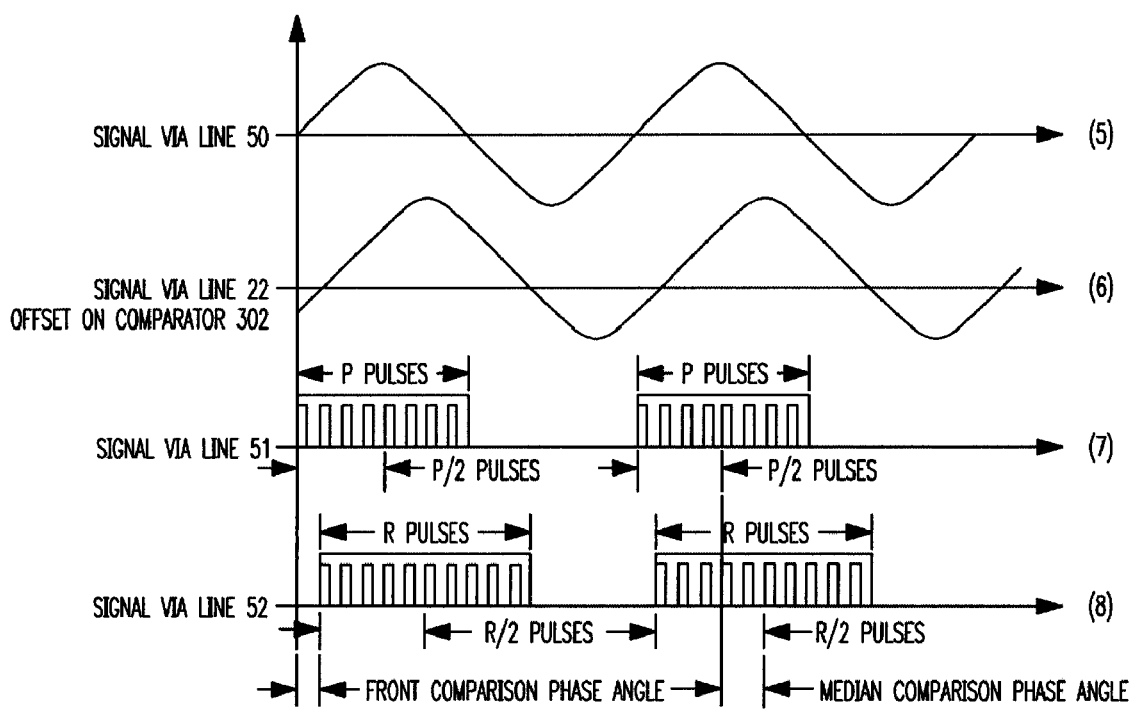

FIG. 4 shows the automatic compensation of an eventual input offset voltage drift caused by its inherent temperature coefficient. Graph (1) shows the AC line voltage AC IN on lines 10 and 20 equivalent signal on line 50. Graph (2) shows the ballast current on lines 10, 11, 21 and 20 equivalent signal on line 22. It is assumed that neither of comparators 301 and 302 of the pulse forming block 3 have any input voltage offsets. Graph (3) and graph (4) show the pulses on lines 51 and 52. There are two methods to determine the phase of the pulses on lines 51 and 52. The first method is to compare the time interval between the fronts (rising front) of pulses on lines 51 and 52, while the second method is to compare the time interval between the middle of pulses on lines 51 and 52. The middle of each pulse on lines 51 and 52 is determined by the MCU block 4 by dividing in half the P and R number of externally generated high frequency pulses counted during the duration of each pulse on lines 51 and 52. The middle so determined of the pulses on lines 51 and 52 should be named "medians". Indeed, as all graphs (1), (2), (3) and (4) show, in the absence of any input voltage offset of comparators 301 and 302 contained by the pulse forming block 3, both methods are error free. However, as graphs (5), (6), (7) and (8) indicate, when one of the comparators 301 and 302 contained by the pulse forming block 3 is experiencing a non-zero input offset voltage, the only method that eliminates any voltage/current phase angle measurement requirement is when measuring the time interval between the medians of pulses on lines 51 and 52, rather than when measuring the time interval between the fronts of these pulses on lines 51 and 52.

Figure 6:
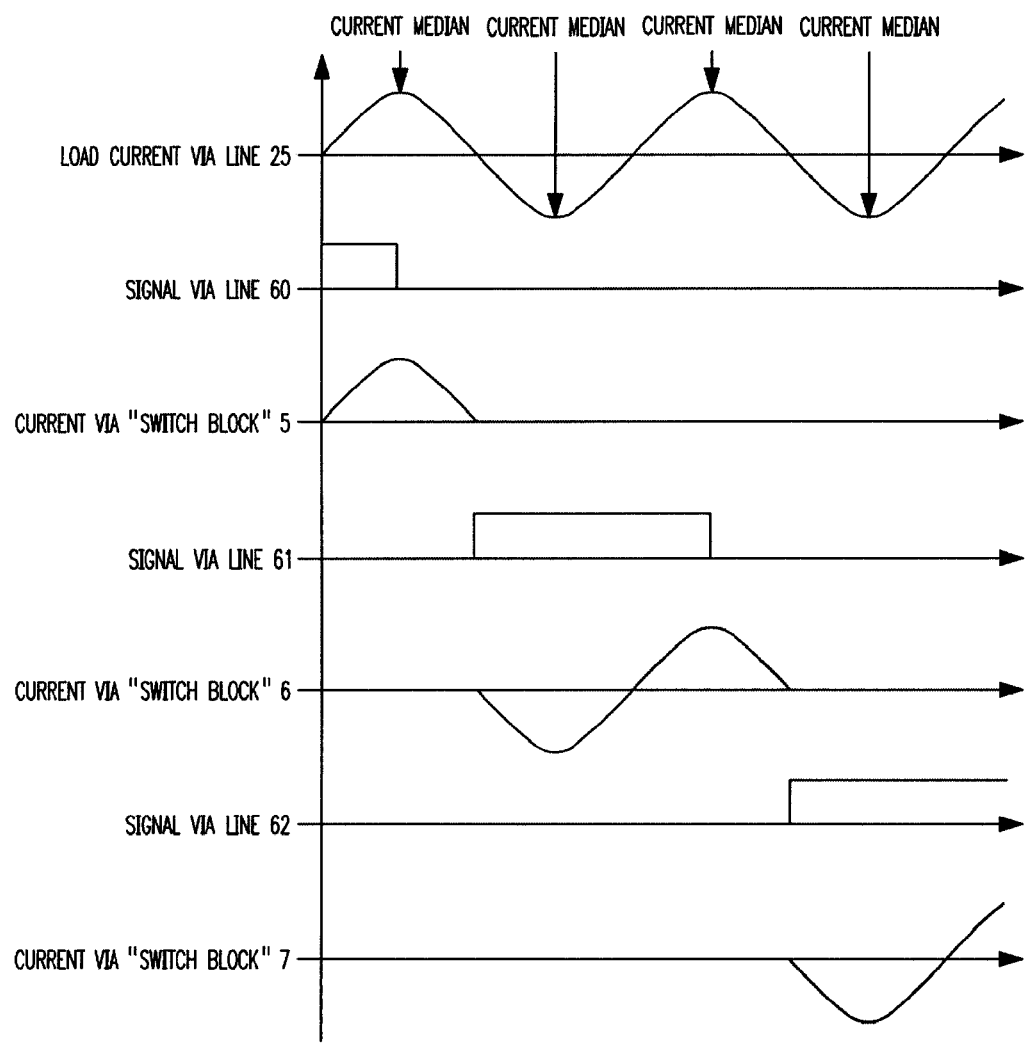
FIG. 6 shows in detail die step voltage variation algorithm for avoiding any load anomaly, such as a HPS lamp being extinguished by the instantaneous change of the applied voltage.

FIG. 6 describes in detail the mechanism of instantaneous voltage variation applied to a ballast for avoiding extinguishing the lamp. Assuming that all conditions described in FIG. 5 for the instantaneous voltage changes are met, the dimming sequence is now described. At the current median described in FIG. 4, MCU block 4 is removing the command signal on line 60. It is known that a triac continues to conduct current until the current value becomes zero; this is happening at the next current zero crossing. Based on this well-known triac property, the current via switch block 5, therefore the current through the ballast on lines 10, 11, 21 and 20 becomes zero. When the ballast current becomes zero, the MCU block 4 instantaneously generates a command signal on line 61, thereafter turning on switch block 6. As a result, the ballast current through lines 10, 11, 21 and 20 continues to flow, following a non-discontinued sinusoidal waveform. Next, MCU block 4 decides to once more reduce the ballast-applied voltage. It will then remove the command signal on line 61 at the ballast current median. At the next ballast current zero crossing, switch block 6 turns off. During this ballast current zero crossing, MCU block 4 generates a command signal on line 62, turning on switch block 7.

The ballast-applied voltage could suffer instantaneous variations in reverse order, in two increments, or by simply applying the voltage on line 10 in one step, if the algorithms described in FIG. 5 and FIG. 6 are observed by MCU block 4.

What is claimed is:

1. A step voltage controlling device, comprising:
   a multiple tap step-down autotransformer connected to an AC input voltage applied across first and second AC voltage input terminals;
   a voltage sensing block connected across the first and second AC voltage input terminals;
   a current sensing block connected between the first AC voltage input terminal and a first output terminal;
   a pulse forming block operatively connected to receive signals from each of the voltage sensing block and the current sensing block and to provide at least two pulsed output signals responsive to the received signals;
   a controller block which receives the at least two pulsed output signals from the pulse forming block and which responsively provides a plurality of command signals;
   a plurality of switch blocks each receiving an associated one of the plurality of command signals from the controller block,
   wherein one switch block of the plurality of switch blocks selectively electrically couples the second AC voltage input terminal and a second output terminal in response to the associated one of the plurality of command signals from the controller block,
   wherein remaining ones of the plurality of switch blocks each separately and selectively electrically couples an associated output tap of the multiple tap step-down autotransformer to the second output terminal,
   wherein, the controller block at least initially generates a command signal which turns on the one switch block so as to provide a full output voltage between the first and second output terminals,
   wherein, after a nominal period of time, the controller block initiates a reduction of an output voltage applied voltage across the first and second output terminals by removing the command signal applied to the one switch block so as to turn off the one switch block and to turn on another one of the plurality of switch blocks so as to provide a reduced output voltage between the first and second output terminals.

2. A method for step controlling a voltage applied to a load, the method comprising:
   providing a multiple tap step-down autotransformer;
   providing multiple voltage switching blocks each coupled electrically to various taps of the multiple tap step-down autotransformer;
   sensing an input voltage;
   sensing a load current;
   forming plural pulsed signals based upon the sensed input voltage and load current;
   processing the plural pulsed signals and generating command signals for each of the multiple voltage switching blocks;
   determining a zero-crossing point of the load current; and
   controlling an instantaneous variation of a voltage applied to the load by synchronizing with the determined zero crossing point.

\* \* \* \* \*